(No Model.)
C. P. CROWE.
SIDE BAR SPRING.
No. 338,585. Patented Mar. 23, 1886.
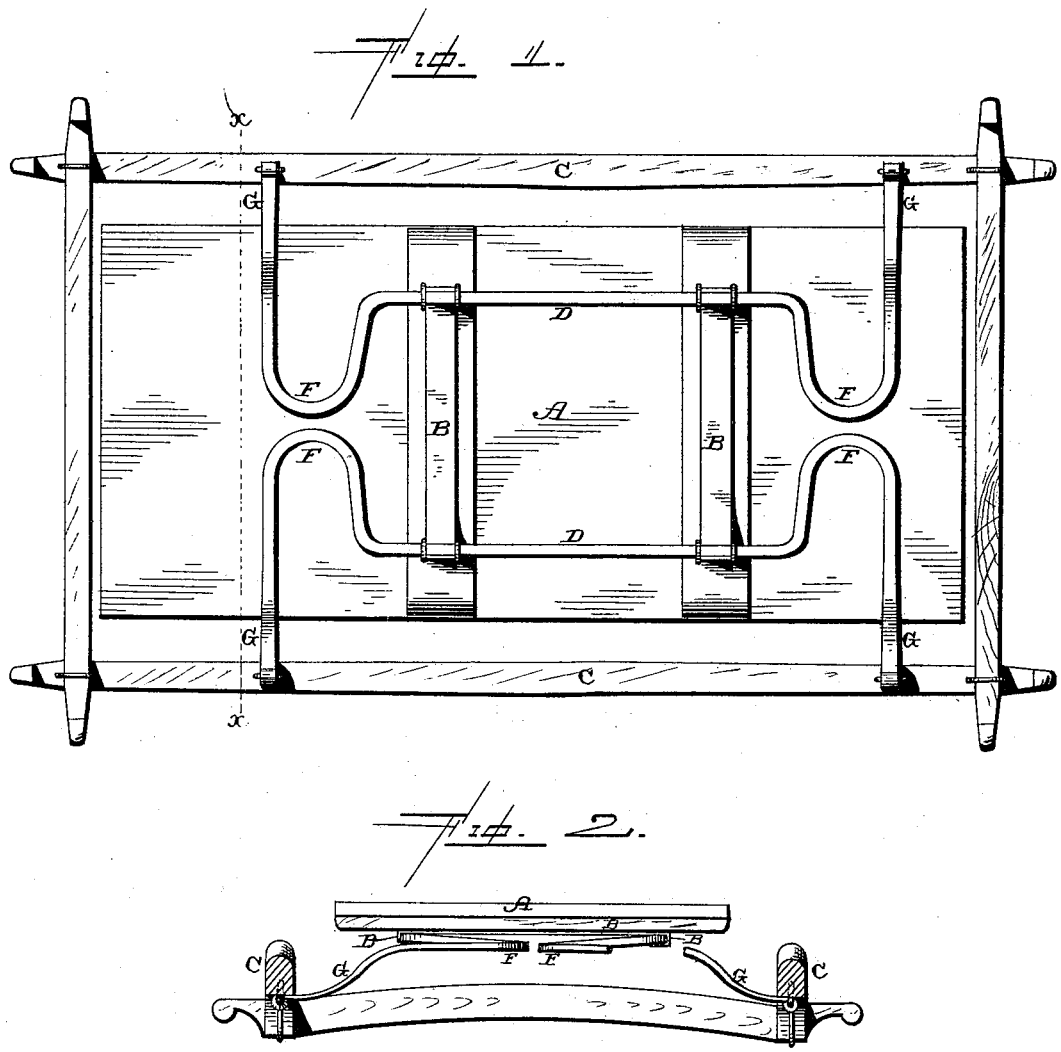
WITNESSES:
L. F. Gardner
B. L. Nevius
INVENTOR.
Chas. P. Crowe,
BY F. A. Lehmann,
ATTORNEY.

UNITED STATES PATENT OFFICE.

CHARLES PHILIP CROWE, OF MOUNT GILEAD, OHIO, ASSIGNOR OF ONE-HALF TO H. M. SMITH, OF SAME PLACE.

SIDE-BAR SPRING.

SPECIFICATION forming part of Letters Patent No. 338,585, dated March 23, 1886.

Application filed January 4, 1886. Serial No. 187,563. (No model.)

*To all whom it may concern:*

Be it known that I, CHARLES PHILIP CROWE, of Mount Gilead, in the county of Morrow and State of Ohio, have invented certain new and useful Improvements in Side-Bar Springs; and I do hereby declare the following to be a full, clear, and exact description of the invention, such as will enable others skilled in the art to which it pertains to make and use it, reference being had to the accompanying drawings, which form part of this specification.

My invention relates to an improvement in side-bar springs; and it consists in a spring which is made from one continuous piece of metal, and which has its central portion to extend parallel with the body of the vehicle, and which has an abrupt bend formed near each end, and then has its end fastened to suitable supports, as will be more fully described hereinafter.

The object of my invention is to produce a combined torsion and curvature spring, which will give a long and easy movement to the body, and which can be produced almost or entirely by machinery.

Figure 1 is an inverted view of a vehicle to which my springs are attached. Fig. 2 is a vertical section taken on the lines $x\ x$ of Fig. 1, a part of one spring being broken away.

A represents the body of the vehicle, which is provided on its under side with the cross-bars B, having turned-down ends, and C are the side bars. Each spring D is made from a single piece of square or other suitably-shaped steel of suitable thickness and length, and which has its central portion to extend parallel with the body of the vehicle, and which spring is fastened in any suitable manner, upon each side of its center, to the under side of the cross-pieces B. These springs D extend in a straight line a suitable distance beyond the outer edges of the cross-bars B, and then each one is given an abrupt bend, F, toward the center of the body, as shown. From this bend F the ends extend outward at right angles to the length of the body A, and are flattened and curved from the bend outward to their ends, and these ends are fastened, by means of a shackle or clip, to the side bars, C. The ends G being curved, the springs have a free vibratory motion extending from the side bars to the inner ends of the curves F, such as is given any curved spring. The central portion of each spring being fastened by means of box-clips to the under side of the body, so that the spring cannot be turned, a torsion strain is produced upon the spring by the movements of the body.

By means of the construction above described a curved and a torsion spring are combined together. Each spring being formed of a single piece of metal, they can be almost if not entirely made by machinery, and thus can be produced at a very slight cost, as compared to springs which are composed of a number of pieces. Two fastenings to the under side of the body and a fastening for each end are all that are necessary to attach each spring to the vehicle. The length and ease of movement which are given to the body by means of the springs depend upon the length and curves of the springs between their outer ends and the bends or curves F. If desired, the central portion may be shortened and fastened parallel with the end of the body, the ends of the spring being then fastened to the axle behind and head-bar in front.

Having thus described my invention, I claim—

A vehicle-spring formed from a single rod or bar of metal, the central portion of which extends parallel with the body of the vehicle, and which is provided with the bends F and the curved ends G, substantially as shown and described.

In testimony whereof I affix my signature in presence of two witnesses.

CHARLES PHILIP CROWE.

Witnesses:
E. N. BOYLE,
NOD N. KEYSER.